Figure 1:
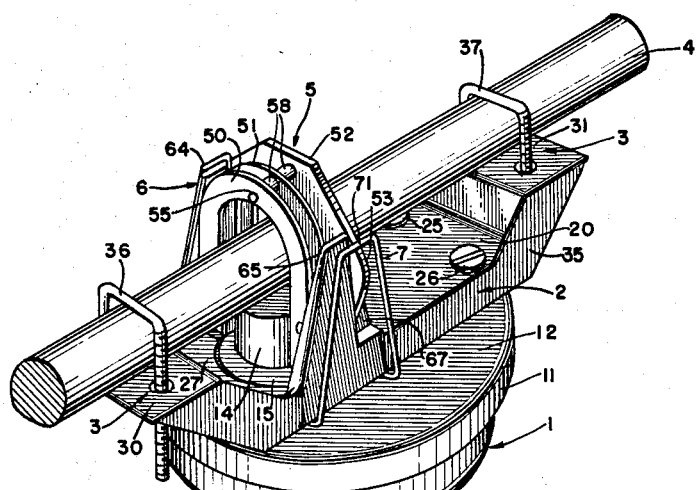

May 28, 1968 L. A. MEDLAR 3,386,032
REMOVABLE CORE STRUCTURES FOR ELECTRICAL DEVICES
Original Filed June 25, 1962 2 Sheets-Sheet 1

INVENTOR
Lewis A. Medlar

BY

ATTORNEYS

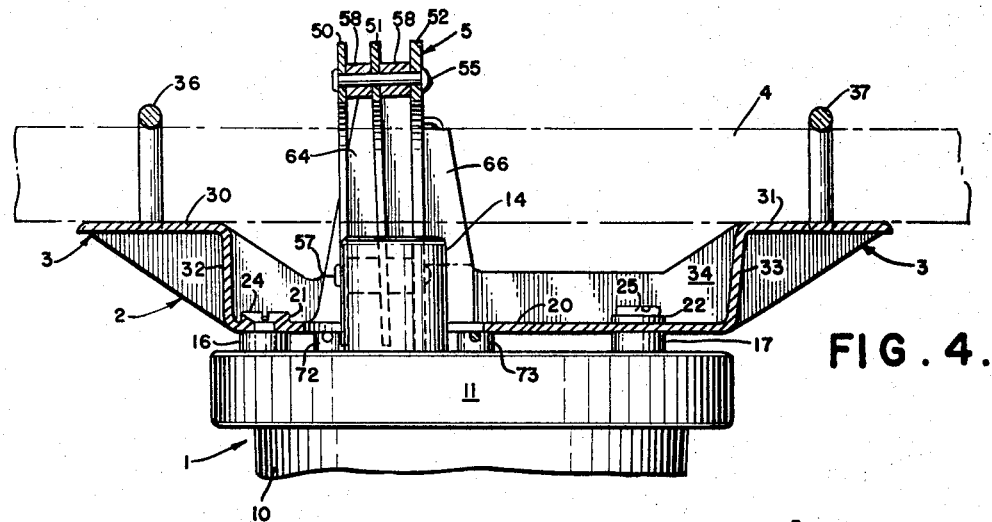
FIG. 4.
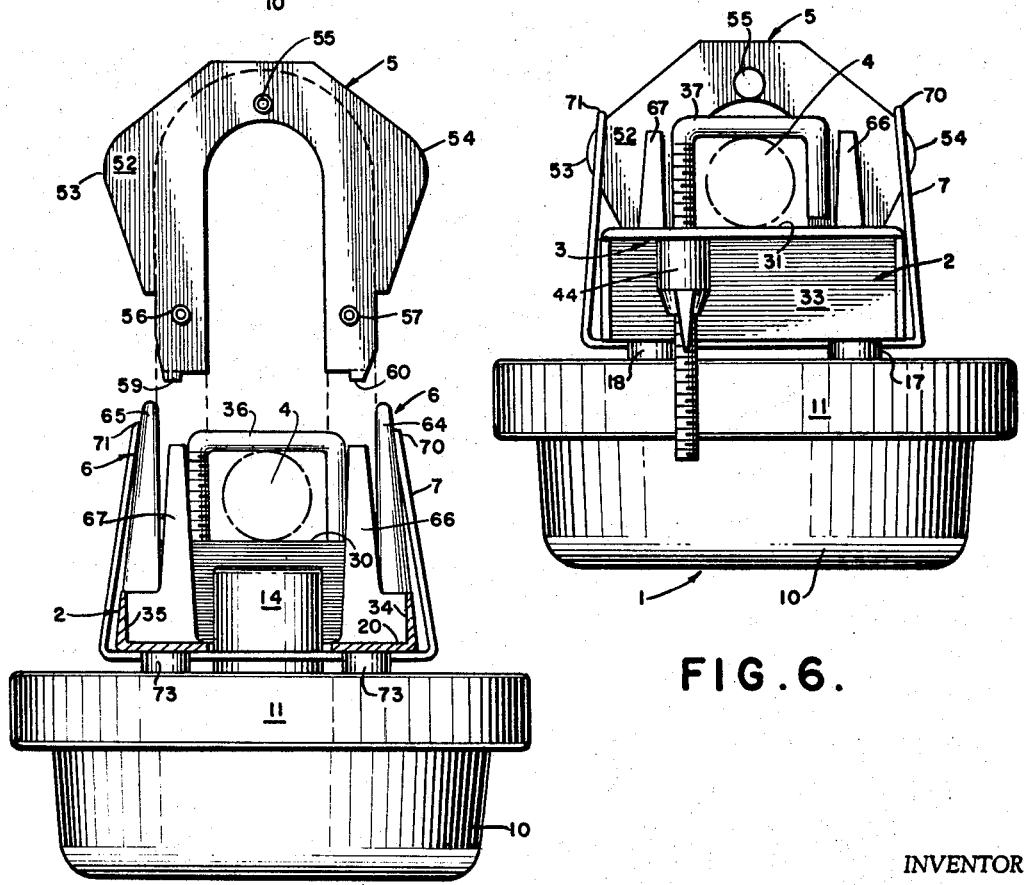
FIG. 5.
FIG. 6.
INVENTOR
Lewis A. Medlar

United States Patent Office 3,386,032
Patented May 28, 1968

1

3,386,032
REMOVABLE CORE STRUCTURES FOR
ELECTRICAL DEVICES
Lewis A. Medlar, Lansdale, Pa., assignor to B. Franklin
Lewis (trading as Lewis Electrical Equipment Co.,
Philadelphia, Pa.), Elmer Adkins, Asbury Park, N.J.,
and Lewis A. Medlar, Lansdale, Pa., copartners
Continuation of application Ser. No. 204,979, June 25,
1962. This application Apr. 28, 1966, Ser. No. 546,106
8 Claims. (Cl. 324—127)

This is a continuation of U.S. patent application Ser. No. 204,979, filed June 25, 1962, in the name of Lewis A. Medlar, and now abandoned.

This invention relates to electrical devices, and more particularly to apparatus for securing such devices directly to current carrying conductors.

Where large current carrying conductors are present, it is sometimes desirable to tap off a small quantity of power from the conductor to operate an auxiliary electrical device. One example of such a device is an ammeter which utilizes the tapped off power to derive an indication of current flow in the conductor. The meter movement can be made responsive to flux surrounding the conductor, and therefore, if the meter is attached to the conductor, current can be measured without connecting the meter in series with the line. Meters of this type have obvious advantages when used in conjunction with power lines to measure current flow, maximum load demand, etc., and have been described previously in copending Lewis A. Medlar applications Ser. Nos. 45,458, 45,459 and 45,460 all filed July 26, 1960 (now, respectively, Patent Nos. 3,114,878, 3,114,879, 3,114,880, all issued Dec. 17, 1963).

Another example of an auxiliary device which can be attached to a current carrying conductor is a small synchronous electric motor which would use the flux developed around the conductor as the motor field flux. Such motors could be used as timers to total the current carrying time, or as a source of mechanical power. Still another example is a transformer used as a source of electrical energy.

The apparatus for securing the auxiliary device to the current carrying conductor must be fairly rigid to maintain the auxiliary device in a proper position over relatively long periods of time. Also, especially when the auxiliary device is an electrical meter, the magnetic coupling portion of the apparatus must be accurately aligned to prevent variations in the flux coupling from one installation to the next. While apparatus of this type has been known in the past, an inexpensive attaching apparatus designed for ease of installation has not generally been available.

Accordingly, it is an object of this invention to provide relatively inexpensive apparatus for attaching an auxiliary electrical device directly to a current carrying conductor.

It is another object of this invention to provide apparatus for mechanically attaching a flux responsive auxiliary electrical device directly to the current carrying conductor which also provides magnetic coupling between the conductor and the device such that the magnetic coupling is the same from one installation to the next.

It is still another object of this invention to provide apparatus for mechanically attaching and magnetically coupling a flux responsive auxiliary device to a current carrying conductor which is very simple to install.

FIG. 1 is a perspective view of an electrical meter connected to a current carrying conductor by means of apparatus in accordance with this invention;

2

Figure 2:
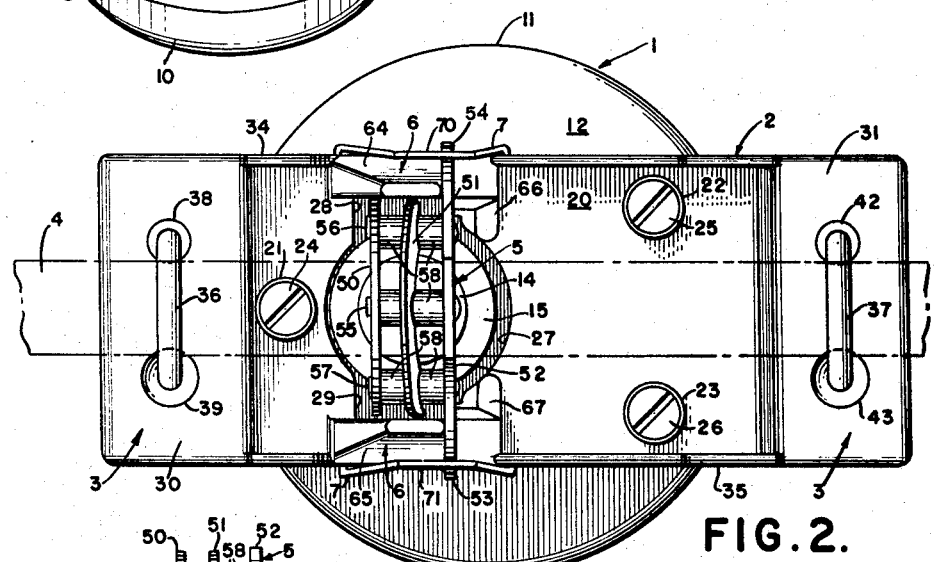
Figure 3:
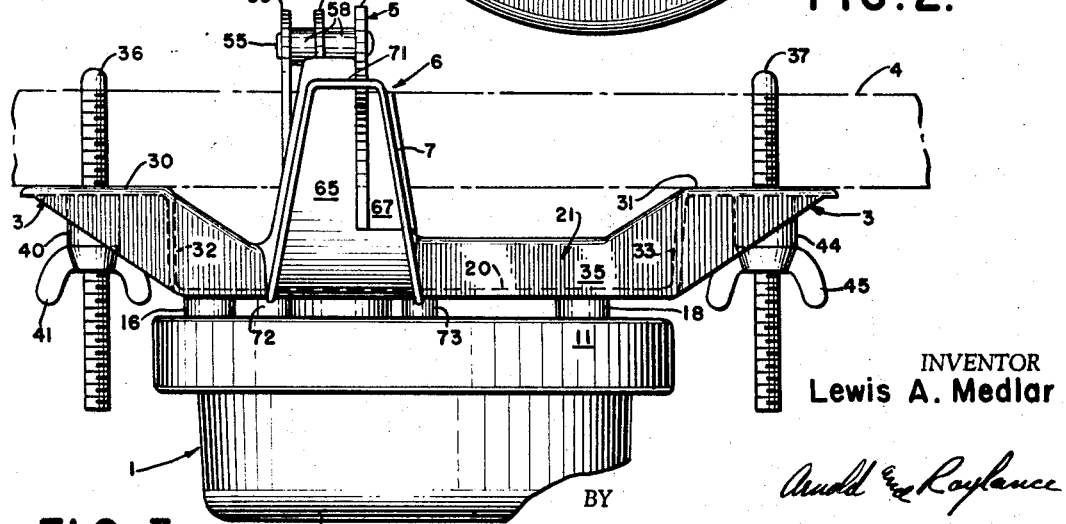

FIG. 2 is a top view of the apparatus;
FIG. 3 is a side elevational view of the apparatus;
FIG. 4 is a side elevational view with portions broken away for clarity of illustration;
FIG. 5 is an end view with the core structure removed and portions broken away for clarity of illustration;
FIG. 6 is an end view of the apparatus.

The apparatus provided in accordance with this invention includes a frame member which is securely fastened to the auxiliary device such as a current indicating meter used in the illustrations. The frame member includes a pair of offset conductor engaging surfaces so arranged that the flux responsive portion of the auxiliary device is maintained at a predetermined space relationship with respect to the conductor. Associated with the engaging surfaces are a set of J bolts which fit over and around the conductor to secure the engaging surfaces. The magnetic flux from the conductor is intensified in the area of the flux responsive portion of the meter by employing a U-shaped laminated magnetic core structure. Several of the laminates of this core structure project outwardly from opposite sides in the form of cam surfaces. The frame member is provided with guide surfaces and the meter structure is provided with stop members. The coupling structure can therefore be accurately guided into position against the stop members. The coupling structure is maintained in position against the stop members by pretensioned springs which are separated by the cam surfaces as the structure is slid into position and are so arranged to maintain the coupling structure in the guide slots and against the stop members.

When attaching the auxiliary device to the current carrying conductor, the J bolts are first extended and the core structure is removed. The conductor engaging surfaces are placed against the conductor and the J bolts are positioned partially surrounding the conductor and then tightened down to mechanically secure the apparatus to the conductor. The core structure is then slid into position surrounding the conductor and is accurately aligned with respect to the auxiliary device by means of the guide surfaces and stop members. The installation of the apparatus is very easily accomplished and provides accurate alignment and uniform magnetic coupling.

Referring to the drawings, FIGS. 1-6, the apparatus includes a flux responsive meter 1 which is the auxiliary device to be mechanically attached and magnetically coupled to a current carrying conductor. A frame member 2 is securely fastened to meter 1 and is provided with offset conductor securing apparatus 3 at each end thereof to provide the mechanical attachment. A removable U-shaped magnetic core structure 5 is adapted for retention in a proper magnetic coupling relationship with flux responsive meter 1 by the guide and stop structure 6, the guide and stop structure being an integral portion of frame 2. A pretensioned spring 7 is associated with the guide and stop structure to retain the core structure in the desired magnetic coupling position.

Meter 1 is of the demand meter type and, in essence, is a highly "overdamped" ammeter. The meter includes a transparent front casing 10 which is generally cup-shaped, having an outwardly flared annular portion at the open end. The meter movement (not shown) is mounted on frame plate 12. A clamping ring 11 provides an inwardly opening annular groove and fits over the upper surface of frame plate 12 and over the flared annular portion of front casing 10, thus clamping the front casing to the frame plate. The scale and pointers of the meter are arranged to be visible through the transparent front casing.

The flux responsive portion of the meter is located within a thimble-shaped housing 14. Housing 14 is of a suitable plastic material and has an outwardly flared edge forming an annular flange at the open end. A sealing ring 15 having an inner diameter sufficient to accommodate the body of housing 14 has threads on the outer diameter adapted to cooperate with threads in an aperture in frame plate 12. Thus, when sealing ring is placed over housing 14 and screwed into position, the sealing ring engages the annular flange, securing housing 14 to the meter. Magnetic vanes connected to the pointer are mounted on a pivotable structure located within housing 14. The vanes tend to align themselves with a transverse magnetic field passing through housing 14. The movement of the magnetic vanes is against spring tension and therefore the position of the vanes provides an indication of the magnetic field strength.

Frame 2 is an integrally molded member of a suitable plastic material, preferably nonmetallic, nonmagnetic, and relatively shatterproof. Frame 2 is securely fastened to the meter 1 by means of three upwardly extending (as viewed in the drawings) internally threaded support bushings 16, 17 and 18, these support bushings being formed as an integrally molded portion of meter frame plate 12. The flat, rectangular base portion of frame 2 is provided with a raised shoulder aperture 21 shaped to properly seat and accommodate a flat head screw 24 which can be threaded into support bushings 16. At the opposite end, base 20 is provided with two similar raised shoulder apertures 22 and 23 shaped to accommodate fillister head screws 25 and 26 which are threaded into support bushings 17 and 18, respectively. When frame 2 is being secured to the meter 1, it is preferable that flat head screw 24 be first threaded into position to accurately align frame 2 with respect to meter 1, and that the fillister head screws 25 and 26 be subsequently threaded into position to rigidly secure the frame in the aligned position.

Base 20 is provided with a generally circular aperture 27 having rectangular portions 28 and 29 extending laterally toward opposite sides of the base. The primary purpose of aperture 27 is to accommodate housing 14, which extends upwardly (as viewed), from meter 1 and extends through base 20. The rectangular portions 28 and 29 of the aperture accommodate portions of the core structure 5 when placed in position transversely aligned with respect to housing 14. Preferably, aperture 27 and housing 14 are placed as close to flat head screw 24 as is conveniently possible, since this portion of the frame is most accurately aligned with respect to meter 1.

The conductor securing apparatus 3 located at one end of frame 2 includes an offset conductor engaging surface 30 lying in a plane parallel to and a certain distance above base 20. Lying in the same plane and positioned at the other end of base 20 is a second conductor engaging surface 31. Surfaces 30 and 31 are supported in their offset positions respectively by end support walls 32 and 33, and by side support walls 34 and 35, these support walls providing rigidity to the integral molded frame structure. The plane in which surfaces 30 and 31 lie is spaced a sufficient distance above base 20 to lie above housing 14. Accordingly, when the apparatus is attached to a current carrying conductor 4, the conductor engages surfaces 30 and 31 and extends longitudinally between the surfaces and is spaced a suitable distance above housing 14.

Conductor 4 is secured to conductor engaging surfaces 30 and 31 respectively by J bolts 36 and 37. These J bolts are of conventional construction, having a short leg parallel to a longer threaded leg and an interconnecting cross leg. Conductor engaging surface 30 is provided with apertures 38 and 39 approximately centered and spaced apart sufficiently to accommodate, respectively, the short and long legs of J bolt 36. Aperture 39 is countersunk from surface 30, and extends downwardly through an extending boss 40 depending below surface 30. Boss 40 is an integrally molded portion of frame 2 and is integrally formed with supporting rib (not shown) extending laterally between side support walls 34 and 35, the supporting rib providing additional rigidity for boss 40 and strengthening the areas surrounding aperture 38. Thus, conductor 4 is securely fastened against conductor engaging surface 30 when wing nut 41 is tightened so that the J bolt urges the conductor against the conductor engaging surface.

Conductor engaging surface 31 is similarly provided with apertures 42 and 43 spaced to accommodate, respectively, the short and long legs of J bolt 37. Countersunk aperture 43 extends downwardly through boss 44 which depends below surface 31. Wing nut 45 is threaded on the long leg of J bolt 37 and when tightened causes the J bolt to urge conductor 4 against conductor engaging surface 31.

Core structure 5 is constructed having three sets of stacked laminae forming three separate laminated core pieces. Core pieces 50 and 51 are generally U-shaped. Core piece 52 has the same internal dimensions but has somewhat different outer dimensions and forms cam surfaces 53 and 54 extending outwardly from opposite sides of the core piece. Stop projections 59 and 60 are formed by extending a portion of the legs of core piece 52. The internal dimensions of the three core pieces are such that the spacing between the parallel leg portions is sufficient to accommodate housing 14 therebetween, and is also sufficient to accommodate the largest diameter current carrying conductor anticipated. A rivet 55, passing through suitable apertures in the upper portion of all three core pieces, and rivets 56 and 57, passing through suitable apertures in the leg portions of the core pieces, mechanically secure the core pieces to form a unitary core structure 5. The separate core pieces are maintained generally parallel to one another by means of suitable cylindrical spacers 58. The core pieces 50–52 are constructed from suitable magnetic material such as iron, whereas rivets 55–57 and spacers 58 are preferably constructed from a non-magnetic material such as aluminum.

The four upwardly extending guide projections 64–67 make up the guide and stop structure 6. These four projections are integrally molded portions of frame 2 and are each tapered, thus decreasing in cross section as the distance from base 20 increases. Guide projections 64 and 65 are similar to one another and are transversely aligned and disposed on opposite sides of aperture 27 in the base of the frame member 2. Guide projections 66 and 67 are also similar to one another and are disposed on opposite sides of aperture 27, but at positions inwardly with respect to guide projections 64 and 65. Guide projections 66 and 67 are located closer to screws 25 and 26, whereas guide projections 64 and 65 are located closer to screw 24.

The transversely opposed sides of guide projections 64 and 65 lie in parallel planes perpendicular to base 20. The distance between these opposed sides is sufficient to accommodate the outer dimension of the leg portions of core pieces 50 and 51. Accordingly, when the core structure 5 is placed in position, as shown in FIG. 2, the spacing between the parallel opposed sides of guide projections 64 and 65 is such as to prevent any transverse movement of the core structure.

The sides of projections 64 and 65 which are adjacent to the opposed sides, and which are disposed closest to legs 66 and 67, respectively, lie in the same transverse plane perpendicular to base 20. One side of each of the guide projections 66 and 67 lies in a second transverse plane perpendicular to base 20. The spacing between the first and second transverse planes is slightly greater than the width of core piece 52, core piece 52 being the core piece having the cam projections 53 and 54. Thus, the spacing between the guide projections 64 and 66 defines an upwardly extending guide slot disposed on one side of aperture 27, and the spacing between guide projections 65 and 67 similarly defines a second upwardly extending guide slot on the opposite side of aperture 27 such that the guide slots are transversely aligned. Therefore, longitudinal movement of core structure 5 with respect to housing 14 is prevented when core structure 5 is positioned as shown in FIG. 2 with the outwardly extending cam surfaces of core piece 52 extending through the guide slots.

The spring 7 may be described as having a double-U configuration supporting two horizontal cross legs 70 and 71. More specifically, spring 7 may be described as including a pair of parallel laterally extending legs having a length somewhat greater than the distance between side walls 34 and 35 of frame 2. One of the laterally extending legs is discontinuous and bent to form two parallel longitudinally extending tabs spaced apart by the extent of the discontinuous portion. Four upwardly extending inwardly inclined legs are integrally attached at the ends of the two laterally extending legs. The four upwardly extending legs support the two horizontal cross legs 70 and 71. The spring structure is so pretensioned that the horizontal cross legs are urged inwardly toward one another.

Two pairs of transversely aligned upwardly extending bosses 72 and 73 are provided as an integral portion of the meter frame plate 12. The four bosses are disposed slightly outside the circumference of aperture 27. Each of the bosses is provided with a laterally extending slot at the free end thereof, the slot being dimensioned to accommodate the laterally extending leg portions of spring 7. The longitudinally extending tabs of the spring (not shown) are positioned inside one pair of transversely aligned bosses, thereby preventing any lateral movement of spring 7. Bosses 72 and 73 extend upwardly a sufficient distance such that when frame 2 is secured in position by screws 24-26, the frame will be flush with the upper surfaces of the bosses to retain spring 7 in the longitudinally extending slots. As best seen in FIG. 5, where core structure 5 is removed, the horizontal cross legs 70 and 71 are urged inwardly against guide projections 64 and 65 and hence these guide projections serve as stops for the pretensioned spring.

When core structure 5 is being placed into position, the outer surfaces of core pieces 50 and 51 are first positioned between the opposing inner surfaces of guide projections 64 and 65. The core structure is moved downwardly until the outwardly extending portions of core piece 52 engage the guide projections. The core piece is then adjusted such that the extended portions of core piece 52 fall into the guide slots defined between legs 64 and 66 and legs 65 and 67. Eventually, as the core structure continues to move downwardly, the horizontal cross legs 70 and 71 begin to engage cam surfaces 54 and 53, respectively. Further downward movement of the core structure forces the cross legs outwardly until such time as the most outwardly extended portions of the cam surfaces pass below the horizontal cross legs 70 and 71 of spring 7. Core structure 5 can continue to move downwardly until stop projections 59 and 60 come to rest against the frame plate 12 of the meter. In the final resting position, core structure 5 is positioned as shown in FIG. 6. In this position, the horizontal cross legs 70 and 71 are still urged toward one another and therefore tend to ride further up on the cam surfaces 53 and 54. This tendency provides a downward force, retaining core structure 5 against frame plate 12.

Thus, it is seen that the guide and stop structure 6 along with spring 7 accurately secures core structure 5 in a precisely aligned position with respect to housing 14. The opposed surfaces of projections 64 and 65 prevent any transverse movement of the core structure, the guide slots prevent any longitudinal movement, and the combination of the horizontal cross legs 70 and 71 of spring 7 in combination with cam surfaces 53 and 54 maintain the core structure against the meter frame plate to prevent any up and down movement.

When core structure 5 is thus positioned, it partially surrounds the current carrying conductor 4. The current flow, through conductor 4, provides a magnetic flux surrounding the conductor in planes perpendicular to the conductor's longitudinal axes. Core pieces 50-52, being of iron construction, provide a relatively low reluctance path and hence serve to intensify this flux and provide a relatively strong magnetic field extending transversely between the legs of the core structure. The flux responsive portion of meter 1 is located within housing 14 and is thus positioned in the intensified magnetic field.

In some instances, it is desirable to somewhat distort the magnetic field extending between the legs of the core structure. Such distortions in the field could, for example, provide more linear meter scale deflections, or provide nonlinear scale deflections of a desired type. The magnetic field is easily distorted by twisting or misaligning one of the core pieces with respect to the others. As shown in the drawings, core piece 51 is misaligned with respect to core pieces 50 and 52.

Although the foregoing apparatus has been described as useful in securing a meter 1 to a current carrying conductor 4, the invention is by no means limited to this combination. For example, the attaching apparatus could easily be employed to maintain a small motor in a position to utilize the flux surrounding a current carrying conductor. Under these circumstances, the attaching apparatus would be modified slightly such that the rotor of the motor would in effect replace the meter's flux responsive portion located within housing 14. Another example is to employ the attaching apparatus as part of a current transformer. The secondary winding of the transformer would be positioned in place of housing 14 and have several turns of wire positioned in a plane parallel to the longitudinal axis of conductor 4 and perpendicular to the direction of flux passing between the legs of core structure 5.

The scope of this invention is more clearly specified in the appended claims.

What is claimed is:

1. In apparatus for attaching a magnetic flux responsive electrical device to a relatively straight electric current carrying conductor, the combination of
   securing means forming a part of the electrical device for maintaining the device in a certain fixed position with respect to the conductor;
   a rigid magnetic core structure rectilinearly separable from said securing means and the electrical device for providing a low reluctance path for magnetic flux surrounding the current carrying conductor so that a substantial quantity of magnetic flux passes through the electrical device when said core structure is properly positioned;
   guide means affixed to the electrical device constructed to rectilinearly guide said core into said proper position; and
   fastening means for removably securing said core structure in said guide means at said proper position.

2. Apparatus in accordance with claim 1 wherein said core structure is provided with at least one outwardly projecting cam surface, and
   said fastening means comprises a resilient member cooperating with said cam surface to removably secure said core structure in said proper position.

3. Apparatus in accordance with claim 1 wherein a pair of projections extend outwardly from opposite sides of said core structure, said projections being adapted for cooperation with said guide means and said fastening means.

4. Apparatus in accordance with claim 3 wherein said guide means includes
   a pair of guide slots adapted for cooperation with said projections and
   a pair of guide surfaces, and
      said guide slots and guide surfaces are constructed to prevent lateral and longitudinal movement of said core structure with respect to said electrical device, and to substantially prevent pivotal movement of said core structure until said core structure is beyond said guide means.

5. In apparatus for magnetically coupling an electric device to a current carrying conductor, the combination of
   an electric device having a magnetic flux responsive portion,
   a plurality of guide projections so extending from said electric device to define
      parallel spaced apart retaining surfaces transversely aligned with respect to said flux responsive portion, and
      a pair of guide slots also transversely aligned with respect to said flux responsive portion;
   a rigid rectilinearly removable core structure dimensioned internally to partially surround the conductor and to intensify, through said flux responsive portion, the magnetic flux surrounding the conductor, and dimensioned externally for cooperation with said retaining surfaces and said guide slots so that said core structure can be accurately positioned longitudinally and transversely with respect to said flux responsive portion.

6. The apparatus in accordance with claim 5 wherein said electrical device is an ammeter having magnetic vanes positioned in said intensified magnetic field and responsive to the magnetic flux thereof.

7. Apparatus in accordance with claim 5 wherein said core structure is provided with at least one outwardly projecting cam surface, and further comprising
   stop means secured to said electrical device, and
   fastening means comprising a pretensioned resilient member secured to said electric device for cooperation with said cam surface to removably retain said core structure against said stop means.

8. The apparatus in accordance with claim 5 wherein said core structure is U-shaped,
   the inwardly facing surface of said U-shaped core is adapted to partially surround the conductor and to intensify magnetic flux between the parallel extending portions,
   the outwardly facing surface of the parallel extending portions being adapted for cooperation with said retaining surfaces,
said core structure further comprising projections extending outwardly from the outwardly facing surface, said projections being adapted for cooperation with said guide slots.

References Cited

UNITED STATES PATENTS

| Re 20,290 | 3/1937 | Stanton | 324—129 |
| 2,295,959 | 9/1942 | Melville et al. | 324—127 X |
| 2,913,689 | 11/1959 | Enikeieff | 336—175 |
| 2,970,746 | 2/1961 | Rowe | 324—127 X |

FOREIGN PATENTS 460,708   2/1937   Great Britain.

RUDOLPH V. ROLINEC, *Primary Examiner.*